United States Patent
Schwämmlein et al.

(10) Patent No.: US 10,155,421 B2
(45) Date of Patent: Dec. 18, 2018

(54) FIXING DEVICE FOR FIXING A MEASURING PRESSURE SENSOR, IN PARTICULAR A TYRE PRESSURE SENSOR

(71) Applicant: ALLIGATOR VENTILFABRIK GMBH, Giengen (DE)

(72) Inventors: Michael Schwämmlein, Gaggenau (DE); Christian Markert, Herbrechtingen (DE)

(73) Assignee: ALLIGATOR VENTILFABRIK GMBH, Giengen (DE)

( * ) Notice: Subject to any disclaimer, the term of this patent is extended or adjusted under 35 U.S.C. 154(b) by 0 days.

(21) Appl. No.: 15/025,135

(22) PCT Filed: Oct. 8, 2014

(86) PCT No.: PCT/EP2014/071558
§ 371 (c)(1),
(2) Date: Mar. 25, 2016

(87) PCT Pub. No.: WO2015/055479
PCT Pub. Date: Apr. 23, 2015

(65) Prior Publication Data
US 2016/0229238 A1    Aug. 11, 2016

(30) Foreign Application Priority Data
Oct. 18, 2013   (DE) .................. 10 2013 221 225

(51) Int. Cl.
*B60C 29/00*    (2006.01)
*B60C 23/04*    (2006.01)
(Continued)

(52) U.S. Cl.
CPC ........... *B60C 23/0498* (2013.01); *F16B 2/08* (2013.01); *F16B 2001/0028* (2013.01)

(58) Field of Classification Search
CPC ........................ B60C 29/02; Y10T 24/2708
(Continued)

(56) References Cited

U.S. PATENT DOCUMENTS 3,154,048 A    10/1964  Neu
4,235,184 A *  11/1980  Schiavone .......... B60C 23/0408
                                                    116/34 R
(Continued)

FOREIGN PATENT DOCUMENTS

DE       195 29 289     2/1997
DE    10 2006 038 059   3/2007
(Continued)

OTHER PUBLICATIONS

International Preliminary Report on Patentability dated Apr. 19, 2016 in PCT/EP2014/071558.
(Continued)

*Primary Examiner* — Terrell L McKinnon
*Assistant Examiner* — Michael McDuffie
(74) *Attorney, Agent, or Firm* — Faegre Baker Daniels LLP

(57) ABSTRACT

The invention concerns a fixing device for fixing a measuring sensor, such as a tire pressure sensor inside a tire cavity on a vehicle rim, in particular utility vehicle rim, comprising a band-shaped tension belt, which carries a receiving device for the measuring sensor:
The invention is characterized in that the tension belt contains at a first end an eyelet for threading a second end opposite the first end, and starting from the second end and away from the first end on the surface of the tension belt, two textile fields are positioned behind one another in the longitudinal direction of the tension belt, one of which is fitted with barbed hooks and the other with loops to form together a Velcro fastener after folding the textile fields together on top of each other.

20 Claims, 1 Drawing Sheet

(51) Int. Cl.
*F16B 2/08* (2006.01)
*F16B 1/00* (2006.01)

(58) Field of Classification Search
USPC ....... 152/415, 427, 429, 431; 73/146, 146.2, 73/146.8; 116/34 R, 34 A, 34 B; 248/205.2
See application file for complete search history.

(56) References Cited

U.S. PATENT DOCUMENTS

| | | | | |
|---|---|---|---|---|
| 4,256,160 A * | 3/1981 | More | | B60C 29/064 |
| | | | | 137/223 |
| 4,432,405 A * | 2/1984 | Grushkin | | B60C 23/12 |
| | | | | 137/223 |
| 4,539,497 A * | 9/1985 | Boyer | | B60C 23/041 |
| | | | | 180/65.51 |
| 4,701,149 A * | 10/1987 | Breil | | A63H 5/00 |
| | | | | 24/306 |
| 5,207,173 A * | 5/1993 | Sadri | | B60C 23/063 |
| | | | | 116/34 B |
| 5,844,131 A | 12/1998 | Gabelmann et al. | | |
| 5,943,705 A | 8/1999 | Sink | | |
| 6,662,665 B1 * | 12/2003 | Huang | | B60C 23/0494 |
| | | | | 73/146 |
| 6,694,807 B2 * | 2/2004 | Chuang | | B60C 23/0408 |
| | | | | 73/146.5 |
| 6,862,929 B2 * | 3/2005 | Luce | | B60C 23/0494 |
| | | | | 73/146.3 |
| 7,271,709 B2 | 9/2007 | Miller et al. | | |
| 8,059,014 B2 * | 11/2011 | Lamping | | B60C 23/0408 |
| | | | | 340/444 |
| 8,327,700 B2 * | 12/2012 | Nagora | | B60C 23/0494 |
| | | | | 73/146 |
| 8,458,864 B1 * | 6/2013 | Patton et al. | | A61F 5/3792 |
| | | | | 24/16 R |
| 8,474,475 B2 * | 7/2013 | Palaoro | | B60C 23/0408 |
| | | | | 137/227 |
| 8,519,869 B2 * | 8/2013 | Lamping | | B60C 23/0413 |
| | | | | 340/425.5 |
| 8,776,589 B1 * | 7/2014 | Brown | | B60C 23/0408 |
| | | | | 73/146 |
| 9,475,350 B2 * | 10/2016 | Lo | | B60C 23/0496 |
| 2003/0047264 A1 * | 3/2003 | Yurjevich | | B60C 23/0493 |
| | | | | 152/450 |
| 2004/0206169 A1 * | 10/2004 | Normann | | B60C 23/0494 |
| | | | | 73/146.2 |
| 2005/0242937 A1 | 11/2005 | Yokoi et al. | | |
| 2009/0159169 A1 | 6/2009 | Durif et al. | | |
| 2010/0288046 A1 | 11/2010 | Sy et al. | | |
| 2011/0296907 A1 | 12/2011 | Luce | | |
| 2012/0291933 A1 | 11/2012 | Tanno et al. | | |
| 2015/0336435 A1 * | 11/2015 | Laird | | B60C 23/0498 |
| | | | | 73/146 |
| 2017/0059435 A1 * | 3/2017 | Marques | | B60C 23/0483 |

FOREIGN PATENT DOCUMENTS

| | | |
|---|---|---|
| DE | 20 2010 016 960 | 2/2011 |
| DE | 20 2010 016960 | 2/2011 |
| DE | 10 2010 037 597 | 3/2012 |
| EP | 0 751 017 | 1/1997 |
| JP | 58-132705 | 9/1983 |
| JP | 5967307 | 5/1984 |
| JP | 7-26206 | 5/1995 |
| JP | 09-136517 | 5/1997 |
| JP | 09136517 | 5/1997 |
| JP | 2008-018106 | 1/2008 |
| JP | 2010-184712 | 8/2010 |
| JP | 2010-11-25 | 11/2010 |
| JP | 2013-042908 | 3/2013 |
| KR | 10-0940512 | 2/2010 |

OTHER PUBLICATIONS

International Search Report and Written Opinion in PCT/EP2014/071558, dated Nov. 28, 2014.

English language translation of Office Action dated Jun. 25, 2018 in JP 2016-548419.

* cited by examiner

FIXING DEVICE FOR FIXING A MEASURING PRESSURE SENSOR, IN PARTICULAR A TYRE PRESSURE SENSOR

CROSS-REFERENCE TO RELATED APPLICATION

The present application is a National Stage of International Application No. PCT/EP2014/071558, filed Oct. 8, 2014, which claims priority to DE 10 2013 321 225.9, filed Oct. 18, 2013, the entire disclosures of which are hereby expressly incorporated herein by reference.

BACKGROUND/SUMMARY

1. Technical Field

The present invention concerns a fixing device for fixing a measuring pressure sensor, in particular a tyre pressure sensor inside a tyre cavity according to the preamble of claim 1.

Tyre pressure sensors are fixed inside the tyre cavity on the tyre or on a vehicle rim so as to detect the air pressure in the tyre or in the tyre cavity continuously or at intervals during vehicle operation. The air pressure detected by the tyre pressure sensor is sent by means of a transmission device, integrated in the tyre pressure sensor, to a receiver in the vehicle and interpreted so that a warning message can be output in case of unacceptable pressure drop.

So far, an appropriate tyre pressure sensor had been fixed to the rim either through a mechanical, advantageously hinged connection of the tyre pressure sensor on the internal end of the tyre valve. The shortcoming is that special constructions of the valves are necessary and there is due to the positioning outside the rim well the risk that the tyre pressure sensor is damaged by removing and replacing the tyre from or on the rim. An example for such a tyre pressure sensor fixed to the tyre valve is disclosed in EP 0 751 017 A2.

DE 10 2006 038 059 A9 describes the fixing of a tyre pressure sensor on a motor vehicle rim by means of an adhesive tape. To do so, a socket is glued by means of the adhesive tape from the outside in the well of the rim. The tyre pressure sensor can then be fixed on the socket. For safety purposes, a lashing belt can be placed through the socket over the rim which is closed hermetically with a belt buckle, which can be designed as a single-use or reusable product, over the circumference of the rim. A crimped lock or a countersunk lock for example as well as a worm gear lock can be considered as a belt buckle. The adhesive strip is usually a double-sided adhesive tape. Therefore; the tyre pressure sensor is fixed primarily with the adhesive tape which prevents reliably that the tyre pressure sensor is shifted on the rim. Strong centrifugal forces which might loosen the socket from the adhesive tape or the adhesive tape from the rim, are compensates for by the belt.

DE 10 2010 037 597 A1 describes an approach deviating therefrom. According to the fixing device represented there, for fixing a tyre module, in particular a tyre module, in particular an air pressure sensor, for tyres, the tyre module should not rest against the vehicle rim. To the contrary, the tyre module should be positioned free inside the tyre cavity so as to improve the quality of the measured temperature of air in the tyre cavity in such a way that the measured temperature is not influenced by the temperature of the vehicle rim. The module must be decoupled thermally from the tyre as well as from the vehicle rim. To do so, it is proposed, starting with the approaches according to which the tyre module is arranged in the tyre cavity without fixing the tyre module, to provide the tyre module freely movable at a band-shaped retaining means, whereby the band-shaped retaining means is substantially coaxial to the vehicle rim in the tyre cavity, whereby the tyre module is placed with a distance from the inner side of the tyre and from the outer side of vehicle rim, when the vehicle tyre is rotating. Accordingly, the tyre module is fixed neither to the rim nor to the tyre inside, for example via a corresponding gluing process. The band-shaped retaining means is looped loose around the vehicle rim and loose fixed to it. To be abrasion-resistant, high-tensile, temperature-resistant and air-permeable, the retaining means may consist of a synthetic fibre material. The ends opposite to one another of the band-shaped retaining means can be connected during assembly to the vehicle rim with a Velcro fastener and the tyre module can be arranged in a closable pocket on the band-shaped retaining means.

The invention concerns exclusively a fixing device for fixing a measuring pressure sensor inside a tyre cavity on a vehicle rim, in which the measuring pressure sensor, in particular a tyre pressure measuring device is braced against the surface of the vehicle rim since the rim temperature should especially be taken into account with an optional temperature measurement. With respect to the state of the art with crimped, countersunk or worm gear belt locks and with belt bands usually made of metal, whereas the primary fixing of the tyre pressure sensor consists in gluing to the rim, the assembly must be faster, more comfortable and less stressing for the rim, and in particular large diameter ranges of various rims should be covered with a single fixing device. At the same time, the shortcomings mentioned initially, observed when fixing tyre pressure sensors to valves, must be avoided.

The object of the present invention is consequently to provide a fixing device for fixing a measuring sensor, in particular a tyre pressure sensor inside a tyre cavity on a vehicle rim, which can be used universally on rims of various diameters and designs and can be used comfortably during the first installation by vehicle manufacturers as well as at retrofitting in workshops.

The object of the invention is solved with a fixing device with the features of claim 1. Advantageous and particularly appropriate embodiments of the invention are disclosed in the dependent claims.

A fixing device according to the invention for fixing a measuring sensor, in particular a tyre pressure sensor inside a tyre cavity on a vehicle rim, in particular a utility vehicle rim, for example for a truck, comprises a band-shaped tension belt, which carries a receiving device for the measuring sensor or tyre pressure sensor. The tension belt and the receiving device are designed for permanently retaining and bracing the sensor at the surface of the vehicle rim. In particular, no additional fixing device such as an adhesive strip or similar is necessary, whereas the sensor is held against the rim solely by the tension belt.

According to the invention, the tension belt comprises on a first of its both ends an eyelet for threading the second end, opposite to the first end. The eyelet can be made in particular of synthetic material, like a hard plastic, and in a particular cost-efficient form of embodiment, be like a closed ring over the circumference, in particular with two linear sections, positioned parallel to one another and connected together on both sides by arcs.

Moreover, the tension belt has in the area of its second end, i.e. away from the first end, two textile fields which are positioned behind one another on its surface, starting from the second end in longitudinal direction of the belt. The textile fields are advantageously produce separately from the material of the securing belt and subsequently fixed thereto. For example, both textile fields can be sewed to the surface of the tension belt, in particular for the most cost-efficient production, exclusively with respective two longitudinal seams (one lateral per edge), which extend in longitudinal direction of the belt. According to the invention, one of both textile fields is provided with barbed hook and the other with loops, so that both textile fields can be laid on top of one another and form together a Velcro fastener. Due to the positioning of both textile fields close to one another on the same surface of the securing belt, the superposition consists in folding over the external second end of the tension belt, once the latter has been pulled through the eyelet, on the adjacent section of the tension belt with the first textile field.

Particularly advantageously, the tension belt consists of a textile band material, in particular of or with polyester and/or nylon. The tension belt can be obtained for example by weaving.

The textile fields can also be obtained from the same or another material as the tension belt.

To fix the measuring sensor to the vehicle rim, in particular in the rim well, the tension belt is wrapped around the vehicle rim, the second end of the tension belt threaded through the eyelet and folded over the eyelet in such a way that the end threaded through the eyelet is laid on the following section from the second end of the tension belt, a section which was just not drawn through the eyelet. Consequently, both textile fields are turned before folding the end of the tension belt oriented away from the surface of the rim on which the tension belt is stretched. After folding, the textile field close to the second end, designated here as first textile field, is turned to face the surface of the rim on which the tension belt is stretched, whereby a portion of the second textile field is usually not covered by the first textile field. As when placing the tyre on the rim, once the measuring sensor has been installed, grease is usually coated over the rim, it is of advantage when the second textile field is the field with barbed hooks and the first textile field is the field with loops, as the barbed hooks are less sensitive to contamination and the loops, burred on the second textile field with the barbed hooks, are protected against grease.

To make that a certain section of the second textile fields, as represented, protrudes over the first textile field when the Velcro fastener is in closed condition, the second textile field in the direction of the longitudinal axis of the tension belt can have a greater length than the first textile field. This guarantees that the second end when the tension belt is stretched, can be raised from the rim or from the area of the tension belt on which it is laid, when the vehicle wheel turns. Such a raising movement could indeed declamp the Velcro fastener gradually.

Both textile fields can be spaced apart from each other, in particular by a distance of 10 cm to 20 cm. This enables that even for various rim diameters to position the eyelet inside said distance and to avoid any kinking of one of both textile fields when folding the end of the tension belt over the eyelet.

Preferably, the receiving device is designed as a textile pocket for the measuring sensor. The textile pocket can in a particularly advantageous form of embodiment enclose the measuring sensor completely and is made at least for a tyre pressure sensor of an air-permeable material. A form of embodiment sets forth that the textile pocket consists of a textile hose which encloses the tension belt over its circumference. In other words, the tension belt is drawn through the hose-shaped textile pocket. At least at one end, the hose is closed to form the textile pocket, for example by a seam. Another form of embodiment provides that the textile hose is sewed at both ends on both sides of the measuring sensor.

Particularly advantageously, said at least one seam which is utilised for closing at least one end of the textile hose, is also used for fixing the textile hose to the tension belt to prevent the textile hose from sliding along the tension belt. For example, the tension belt is guided at its first end through the hose and subsequently by forming a loop in which the eyelet is received, is turned over from the outside on the hose and there fixed to the hose, advantageously sewed where then in particular said seam is used for closing the hose on the end facing the first end of the tension belt.

The tension belt can be fixed according to an embodiment of the invention solely by lashing, and by the adhesive friction between the material, in particular the textile material of the tension belt and the rim surface to prevent any sliding along the rim. An alternative form of embodiment provides that the tension belt is provided in the area of its middle between on the one hand the first end and on the other hand the longitudinal section between both textile fields with a non-slip element on the surface facing the fixing device or laid thereon of the rim in intended use. Such a non-slip element may be a silicone pad or other rubbery coatings or inclusions in the tension belt. The positioning of the non-slip element in the area provides the advantage that the area tension belt opposite in the directions of the diameter, for example the hose-shaped pocket fastened to the first end, can receive the measuring sensor and then due to the centrifugal forces during rotation of the rim which pull the comparatively heavy measuring sensor outwardly, presses the non-slip element on the surface of the rim.

The receiving device for the measuring sensor is advantageously positioned in intended use of the fixing device on the side of the tension belt facing the rim so that the measuring sensor received in the receiving device is enclosed between the tension belt and the rim. For example, the pocket which contains the receiving chamber for the measuring sensor, can be positioned between the tension belt and the surface of the rim. This is particularly advantageous in an embodiment, in which the pocket is designed as a one-sided open hose since the measuring sensor can be safely prevented from sliding away out of the open end of the hose by bracing the tension belt.

The invention enables to assemble a measuring sensor as for instance a tyre pressure sensor without a tool on a rim. An easily adjustable longitudinal adaptation for diverse rim forms and rim diameters is possible. The sensor can particularly advantageously be held by way of a positive fit. The wheel imbalance is reduced by the predominantly concentric weight distribution of the fixing device.

The fixing device is reusable and in particular washable. The rim is not exposed to any risk of corrosion in a form of embodiment of the fixing device which is exempt of metal parts. In particular when using a textile band material for the tension belt and advantageously of a textile material for the pocket for receiving the measuring sensor, the highest electromagnetic compatibility is achieved and chemical or galvanic interactions with the material of the vehicle rim are prevented.

The width of the tension belt ranges advantageously from 20 to 30 mm, in particular 25 mm. Advantageously, an adjustment range of 150 mm or more is set forth so that most rim types can be covered.

If the receiving device is designed as a pocket, the latter can be made of another material as the tension belt. The pocket can be wider than the tension belt according to an embodiment.

The invention will be described below using an exemplary embodiment and the figures by way of example.

The figures are as follows:

FIG. 1 shows a diagrammatical elevation view on a fixing device according to the invention;

FIG. 2 shows a lateral view of the fixing device according to the invention from FIG. 1 in the area of the receiving device for the measuring sensor.

Figure 1:
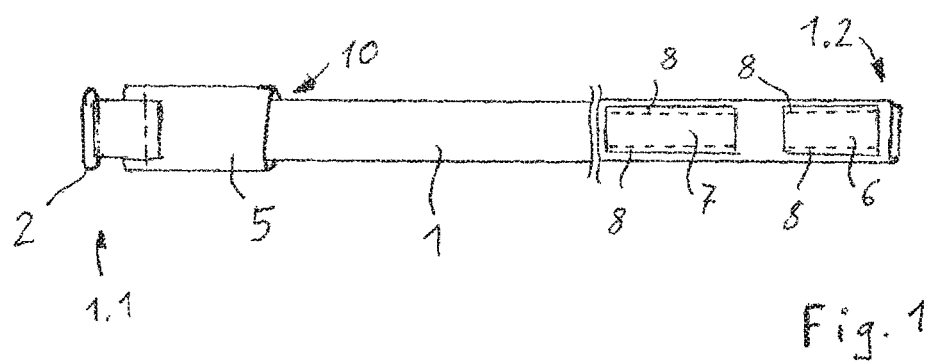
FIG. 1 represents an elevation view on a fixing device according to the invention with a band-shaped tension belt 1 which carries on a first end 1.1 an eyelet 2 through which the second end 1.2 is pulled. The eyelet 2 is captive-mounted in a loop 3 on the first end of the tension belt 1, as can be seen from FIG. 2, whereby the loop 3 is formed by turning over the tension belt 1 at its first end 1.1 and by sewing of the turned over section on the neighbouring section in the area of the first end 1.1, see seam 4. The seam 4 enables to fix a receiving device 5 in the form of a hose-shaped pocket and thereby to prevent any sliding of the pocket in longitudinal direction of the tension belt 1. At the same time, the first end of the receiving device 5 is closed by this seam 4 whereas conversely the second end is designed as an open end, through which the measuring sensor 10, in particular the tyre pressure sensor, is inserted into the receiving device 5 and can be removed therefrom.
Figure 2:
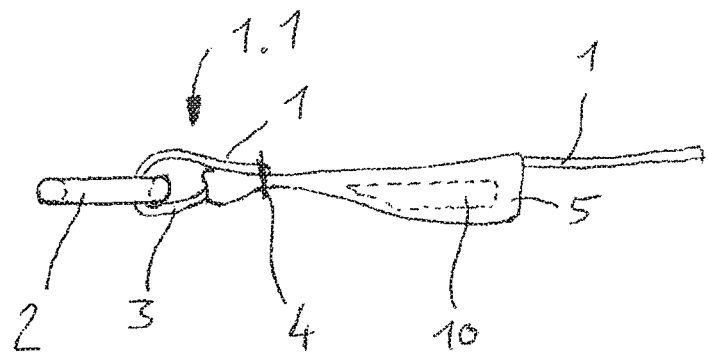

The measuring sensor in FIG. 1 is positioned under the tension belt 1 in the receiving device 5 so that it is placed between the tension belt 1, more precisely a first surface of the tension belt 1 and the vehicle rim, when enclosing a vehicle rim (not represented) with the tension belt 1.

As can be seen in FIG. 1, the tension belt 1 has two textile fields 6, 7 on its second external surface—referring to the intended use of rim—in the area of its second end 1.2, i.e. a first textile field 6 and a second textile field 7. The first textile field 6 is positioned directly on the second end 1.2. The second textile field 7 is spaced from the first textile field 6, but still in the region of the second end 1.2 of the tension belt 1. Both textile fields 6, 7 are for example sewed respectively with two longitudinal seams 8 on the surface of the tension belt 1. Both textile fields 6, 7 form together a Velcro fastener if namely the second end 1.2 is pulled through the eyelet 2 with the section carrying the first textile field 6 and subsequently the first textile field 6 is burred by folding the tension belt 1 on the second textile field 7 in the region of the second end 1.2.

DETAILED DESCRIPTION

Advantageously, the first textile field 6 is provided with loops and the second textile field 7 with small hooks so as to constitute the Velcro fastener mentioned.

What is claimed is:

1. A fixing device for fixing a measuring sensor, such as a tyre pressure sensor inside a tyre cavity on a vehicle rim, in particular a utility vehicle rim, comprising
a band-shaped tension belt, which carries a receiving device for the measuring sensor;
wherein
the tension belt contains at a first end an eyelet for threading a second end opposite the first end, and
starting from the second end and away from the first end on the surface of the tension belt, two textile fields are positioned behind one another in the longitudinal direction of the tension belt, one of which is fitted with barbed hooks and the other with loops to form together a fastener after folding the textile fields together on top of each other.

2. The fixing device according to claim 1, wherein the tension belt is made of a textile band material of or with polyester and/or nylon.

3. The fixing device according to claim 1, wherein starting at the second end the first textile field is fitted with loops and the second textile field is fitted with barbed hooks.

4. The fixing device according to claim 1, wherein both textile fields are positioned at a distance from each other.

5. The fixing device according to claim 1, wherein the eyelet is made of a synthetic material.

6. The fixing device according to claim 1, wherein the receiving device comprises a textile pocket.

7. The fixing device according to claim 6, wherein the textile pocket is formed by a textile hose which surrounds the tension belt over its circumference, whereas the hose is closed only at one end or at both ends.

8. The fixing device according to claim 7, wherein the tension belt is guided at a first end through the hose and subsequently by forming a loop in which the eyelet is receiving in a captive manner, is turned over from the outside on the loop and then fixed to the hose.

9. The fixing device according to claim 7, wherein the hose is closed at one end facing the first end of the tension belt by a seam, which at the same time fixes the tension belt by forming the loop from the outside on the hose.

10. The fixing device according to claim 1, wherein, seen from the second end of the tension belt, the second textile field has a greater length than the first textile field.

11. The fixing device according to claim 1, wherein the tension belt is provided with a non-slip element on the surface facing the fixing device of the rim in intended use, in the area of its middle between on the one hand the first end and on the other hand the longitudinal section between both textile fields.

12. The fixing device according to claim 7, wherein the pocket has a first internal receiving chamber of the measuring sensor on the side of the tension belt facing the rim in intended use.

13. The fixing device according to claim 2, wherein starting at the second end the first textile field is fitted with loops and the second textile field is fitted with barbed hooks.

14. The fixing device according to claim 2, wherein both textile fields are positioned at a distance from each other.

15. The fixing device according to claim 3, wherein both textile fields are positioned at a distance from each other.

16. The fixing device according to claim 2, wherein the eyelet is made of a synthetic material.

17. The fixing device according to claim 3, wherein the eyelet is made of a synthetic material.

18. The fixing device according to claim 4, wherein the eyelet is made of a synthetic material.

19. The fixing device according to claim 2, wherein the receiving device comprises a textile pocket.

20. The fixing device according to claim 3, wherein the receiving device comprises a textile pocket.

* * * * *